(12) United States Patent
Reddy et al.

(10) Patent No.: US 9,708,524 B2
(45) Date of Patent: Jul. 18, 2017

(54) POLYMERIZABLE MONOMER COMPOSITIONS COMPRISING MONOMERS WITH HIGH AFFINITY FOR SAND GRAIN SURFACES FOR SAND CONSOLIDATION APPLICATIONS

(71) Applicant: Halliburton Energy Services, Inc., Houston, TX (US)

(72) Inventors: B. Raghava Reddy, The Woodlands, TX (US); Feng Liang, Cypress, TX (US)

(73) Assignee: Haliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/916,923

(22) PCT Filed: Sep. 12, 2013

(86) PCT No.: PCT/US2013/059355
§ 371 (c)(1),
(2) Date: Mar. 4, 2016

(87) PCT Pub. No.: WO2015/038122
PCT Pub. Date: Mar. 19, 2015

(65) Prior Publication Data
US 2016/0215199 A1 Jul. 28, 2016

(51) Int. Cl.
*C09K 8/00* (2006.01)
*C09K 8/575* (2006.01)
(Continued)

(52) U.S. Cl.
CPC ............ *C09K 8/5755* (2013.01); *C09K 8/565* (2013.01); *C09K 8/575* (2013.01); *C09K 8/68* (2013.01); *C09K 8/88* (2013.01)

(58) Field of Classification Search
CPC ...... C09K 8/565; C09K 8/5755; C09K 8/575; C09K 8/68; C09K 8/88
(Continued)

(56) References Cited

U.S. PATENT DOCUMENTS

| 4,085,160 A | 4/1978 | Anderson et al. |
| 4,312,605 A | 1/1982 | Clarke |

(Continued)

FOREIGN PATENT DOCUMENTS

| GB | 1303456 | 1/1973 |
| WO | 90/12822 | 1/1990 |

(Continued)

OTHER PUBLICATIONS

PCT International Search Report and Written Opinion, dated Jun. 25, 2014, Appl No. PCT/US2013/059355, "Polymerizable Monomer Compositions Comprising Monomers with High Affinity for Sand Grain Surfaces for Sand Consolidation Applications," Filed Sep. 12, 2013, 19 pgs.

*Primary Examiner* — David Karst
(74) *Attorney, Agent, or Firm* — Iselin Law PLLC; Craig Roddy

(57) ABSTRACT

A method of treating a subterranean formation including providing a treatment fluid comprising an aqueous base fluid, a polyvalent metal salt of a carboxylic acid containing monomer, and a cationic monomer. The treatment fluid is combined with a polymerization initiator and is introduced into a subterranean formation. Upon contacting unconsolidated proppants, the treatment method produces consolidated proppants.

26 Claims, 1 Drawing Sheet

(51) Int. Cl.
　　　*C09K 8/565*　　　(2006.01)
　　　*C09K 8/68*　　　(2006.01)
　　　*C09K 8/88*　　　(2006.01)

(58) Field of Classification Search
　　　USPC .................................................. 523/131, 130
　　　See application file for complete search history.

(56) References Cited

U.S. PATENT DOCUMENTS

| | | |
|---|---|---|
| 4,318,835 A | 3/1982 | Clarke |
| 4,339,370 A | 7/1982 | Parker |
| 5,250,645 A | 10/1993 | Maurer |
| 5,342,149 A | 8/1994 | McCabe et al. |
| 5,470,425 A | 11/1995 | Dischö |
| 6,450,260 B1 * | 9/2002 | James .................... C09K 8/508 166/277 |
| 8,413,720 B2 | 4/2013 | Pauls et al. |
| 2007/0114032 A1 * | 5/2007 | Stegent .................... C09K 8/56 166/287 |
| 2013/0048283 A1 | 2/2013 | Makarychev-Mikhailov et al. |

FOREIGN PATENT DOCUMENTS

| | | |
|---|---|---|
| WO | 01/05365 | 1/2001 |
| WO | 02/04784 | 1/2002 |
| WO | 2015/038122 | 3/2015 |

* cited by examiner

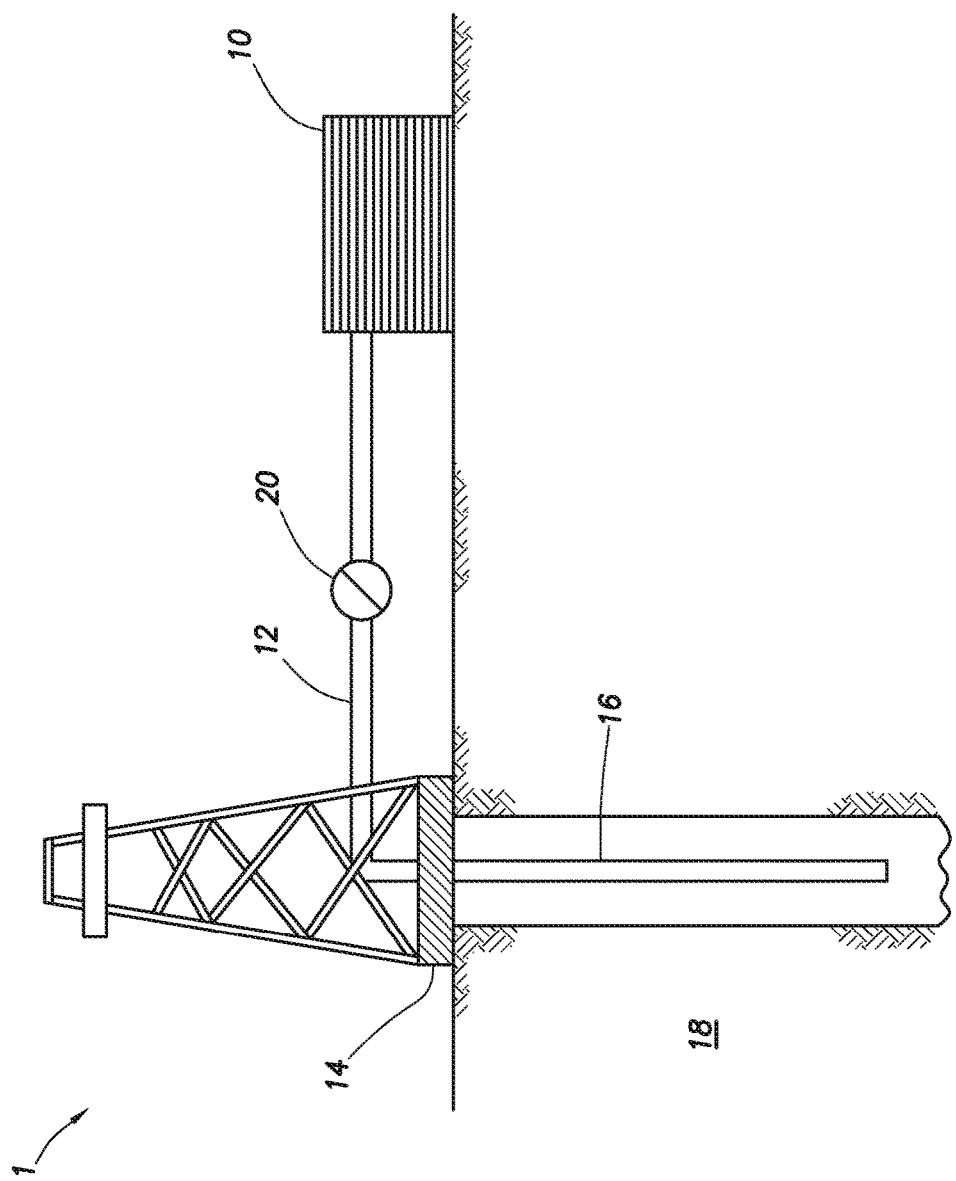

US 9,708,524 B2

POLYMERIZABLE MONOMER COMPOSITIONS COMPRISING MONOMERS WITH HIGH AFFINITY FOR SAND GRAIN SURFACES FOR SAND CONSOLIDATION APPLICATIONS

BACKGROUND

The present invention generally relates to the use of polymerizable treatment fluids in subterranean operations, and, more specifically, to the use of polymerizable treatment fluids comprising polymerizable monomer compounds and polymerization initiators, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

Typical sand consolidation treatments use plastic resins, and are not entirely satisfactory. Resins tend to reduce the permeability of the consolidated formation below acceptable levels. In addition, resins are relatively costly on a unit volume basis and can be operationally very difficult to properly place in the formation. Some treatments are oil based and use water insoluble components. When such materials are water-based, they are used as emulsions. The reactions undergone by such emulsions and following deposition of reacted material on the sand surface prior to addition of sand to fracturing gel solutions require careful tailoring of mixing conditions, and frequently such reactions do not progress far enough prior to exposure to water in the fracture gel and consequently suffer from leaching into water. Additionally, such materials have associated toxicity, for example bisphenol A epoxides and amine curing agents.

Accordingly, an ongoing need exists for more effective and less toxic compositions and methods for consolidating sand and other proppant particles in subterranean formations.

BRIEF DESCRIPTION OF THE DRAWINGS

The following FIGURE is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 depicts an embodiment of a system configured for delivering the consolidating agent composition comprising treatment fluids of the embodiments described herein to a downhole location.

DETAILED DESCRIPTION

In some embodiments of the present invention, a method of treating a subterranean formation includes placing a first stream comprising an aqueous base fluid, a polyvalent metal salt of a carboxylic acid containing monomer, and a cationic monomer into a zone in the subterranean formation where the zone includes unconsolidated particulates; placing second stream comprising a polymerization initiator into the zone; and forming consolidated particulates upon the contacting of the polyvalent metal salt of a carboxylic acid containing monomer, cationic monomer and the polymerization initiator with the unconsolidated particulates.

In certain embodiments of the present invention, a method of treating a subterranean formation comprises placing a first stream comprising an aqueous base fluid, a polyvalent metal salt of a carboxylic acid containing monomer, a cationic monomer, and a polymerization initiator into a wellbore in a subterranean formation, said formation comprising unconsolidated particulates; and forming consolidated particulates upon the contacting of the polyvalent metal salt of a carboxylic acid containing monomer, cationic monomer and the polymerization initiator with the unconsolidated particulates.

Some embodiments of the present invention provide a method for treating a well including providing a wellbore in a subterranean formation; placing a first stream comprising an aqueous base fluid, a polyvalent metal salt of a carboxylic acid containing monomer, a cationic monomer and proppant particulates into the subterranean formation at a rate and pressure sufficient to create or enhance at least one fracture therein, wherein the proppant particulates are coated with the aqueous base fluid, polyvalent metal salt of a carboxylic acid containing monomer, and cationic monomer during the suspension of the proppant in the first stream, and said coated proppant particulates form a proppant pack in the at least one fracture; placing a second stream into the wellbore comprising a substantially solids-free aqueous base fluid, wherein the second stream removes at least one component of the first stream from unwanted areas; placing a third stream comprising a polymerization initiator into the wellbore in a position to contact the proppant particulates; and forming consolidated proppant particulates upon the contacting of the polyvalent metal salt of a carboxylic acid containing monomer, cationic monomer and the polymerization initiator with the proppant particulates in the proppant pack. As used herein, the term "substantially solids-free" refers to a fluid having less than 10% by weight of solid particulates included therein.

Another embodiment of the invention includes a well treatment system including a well treatment apparatus configured to: form or provide a first stream comprising an aqueous base fluid, a polyvalent metal salt of a carboxylic acid containing monomer, and a cationic monomer; form or provide a second stream comprising a polymerization initiator; place the first stream into a zone in a subterranean formation, said zone comprising unconsolidated particulates; place the second stream comprising a polymerization initiator into the zone; and form consolidated particulates upon the contacting of the polyvalent metal salt of a carboxylic acid containing monomer, cationic monomer and the polymerization initiator with the unconsolidated particulates.

In one embodiment, a method of treating a subterranean formation includes providing a first treatment fluid comprising an aqueous base fluid, a polyvalent metal salt of a carboxylic acid containing monomer, and a cationic monomer; providing a second stream comprising a polymerization initiator; placing the first stream into a zone in the subterranean formation where the zone includes unconsolidated particulates; placing the second stream into the zone; and forming consolidated particulates upon the contacting of the polyvalent metal salt of a carboxylic acid containing monomer, cationic monomer and the polymerization initiator with the unconsolidated particulates. In some embodiments, the forming includes crosslinking of the polyvalent metal salt of a carboxylic acid containing monomer, the cationic monomer, and a crosslinker thereby forming a crosslinked polymer compound. In further embodiments, the crosslinked polymer compound is cured and adsorbed onto the unconsolidated particulates. In certain embodiments, polymerization initiator comprises a radical generating organic initiator. Preferred examples of the radical generating organic initiator may be selected from the group consisting of an azo-initiator; a peroxide initiator; a hydroperoxide initiator; and any combination thereof. In some embodiments, polymerization initiator is an inorganic peroxy compound. Suitable peroxy salts may include, but are not limited to, sodium persulfate; potassium persulfate; ammonium persulfate; sodium perborate; sodium percarbonate; any derivative thereof; and any combination thereof. In exemplary embodiments, the inorganic water-soluble polymerization initiator selected is sodium persulfate. The inorganic water-soluble polymerization initiator may be present in an amount in the range of from and upper limit of about 5%, 4.8%, 4.6%, 4.4%, 4.2%, 4%, 3.8%, 3.6%, 3.4%, 3.2%, 3%, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the water-soluble polymerizable monomer composition. In other embodiments, the inorganic water-soluble polymerization initiator may be present in an amount in the range of from about 1% to about 2% by weight of the water-soluble polymerizable monomer composition.

In some embodiments, the at least one polymerization agent is selected from the group consisting of: an amine; an amino alcohol; and any combination thereof. As used herein, the term "polymerization agent" refers to any solid that accelerates the polymerization rates when used in combination with a polymerizable monomer composition and a polymerization initiator. As used herein, "polymetal metal" refers a metal ion which has a positive charge that is 2 or greater, and includes $2^+$, $3^+$, $4^+$, $5^+$ and the like. In some embodiments, preferred examples of the carboxylic acid monomer are selected from the group consisting of acrylic acid; alkyl-acrylic acid; derivatives thereof; and any combination thereof. In exemplary embodiments, the carboxylic acid monomer is magnesium acrylate. In certain embodiments, the cationic monomer is selected from the group consisting of 2-(Acryloyloxy)ethyl-trimethylammonium chloride; and combinations thereof. One of skill in the art may determine the rate of curing by adjusting the compositions of and the amount of the components in the first and or second streams. In some embodiments, the adjusting of the types and amounts of components is based on the downhole temperature. In some embodiments, a coupling agent is added to the wellbore in at least one of the first treatment fluid, the second treatment fluid, a separate stream, and combinations thereof. As used herein, a coupling agent is a compound whose molecules contain functional groups that bond with both organic and inorganic materials and as such help bonding, adsorption or adhesion of materials of different polarities to each other. Suitable coupling agents include a quaternary ammonium compound, a silicone-based coupling agent (e.g., a silicone-based coupling agent comprising a siloxy moiety), and any combinations thereof. In certain embodiments, a polymerization retarder is added to the wellbore in at least one of the first treatment fluid, the second treatment fluid, a separate stream, and combinations thereof. As used herein, a polymerization retarder is a compound that delays the onset of polymerization for a desired duration. Examples of polymerization retarders include at least one of potassium ferricyanide, potassium manganicyanide, hydroquinone, derivatives thereof, and combinations thereof. In several embodiments, a crosslinking multifunctional monomer is added to the wellbore in at least one of the first treatment fluid, the second treatment fluid, a separate stream, and combinations thereof. In certain embodiments, the crosslinking multifunctional monomer is selected from the group consisting of ethylene bisacrylamide, methylene bisacrylamide, trimethylol propane triacrylate, trimethylol propylene diacrylate, ethyleneglycol diacrylate, pentaerythrytol triacrylate, pentaerythrytol diacrylate, triallylcyanurate, and combinations thereof.

In certain embodiments of the present invention, a method of treating a subterranean formation includes providing a first treatment fluid comprising an aqueous base fluid, a polyvalent metal salt of a carboxylic acid containing monomer, a cationic monomer, and a polymerization initiator; placing the first stream into a wellbore in a subterranean formation, said formation comprising unconsolidated particulates; and forming consolidated particulates upon the contacting of the polyvalent metal salt of a carboxylic acid containing monomer, cationic monomer and the polymerization initiator with the unconsolidated particulates. In some embodiments, the forming includes crosslinking of the polyvalent metal salt of a carboxylic acid containing monomer and the cationic monomer, thereby forming a crosslinked polymer compound. In further embodiments, the crosslinked polymer compound is cured while being adsorbed onto the unconsolidated particulates. In certain embodiments, polymerization initiator comprises a radical generating organic initiator. Preferred examples of the radical generating organic initiator may be selected from the group consisting of an azo-initiator; a peroxide initiator; a hydroperoxide initiator; and any combination thereof. In some embodiments, polymerization initiator is an inorganic peroxy compound. Suitable peroxy salts may include, but are not limited to, sodium persulfate; potassium persulfate; ammonium persulfate; sodium perborate; sodium percarbonate; any derivative thereof; and any combination thereof. In exemplary embodiments, the inorganic water-soluble polymerization initiator selected is sodium persulfate. The inorganic water-soluble polymerization initiator may be present in an amount in the range of from and upper limit of about 5%, 4.8%, 4.6%, 4.4%, 4.2%, 4%, 3.8%, 3.6%, 3.4%, 3.2%, 3%, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the water-soluble polymerizable monomer composition. In other embodiments, the inorganic water-soluble polymerization initiator may be present in an amount in the range of from about 1% to about 2% by weight of the water-soluble polymerizable monomer composition.

In some embodiments, the at least one polymerization agent is selected from the group consisting of: an amine; an amino alcohol; and any combination thereof. As used herein, the term "polymerization agent" refers to any solid that accelerates the polymerization rates when used in combination with a polymerizable monomer composition and a polymerization initiator. As used herein, "polymetal metal" refers a metal ion which has a positive charge that is 2 or greater, and includes $2^+$, $3^+$, $4^+$, $5^+$ and the like. In some embodiments, preferred examples of the carboxylic acid monomer are selected from the group consisting of acrylic acid; alkyl-acrylic acid; derivatives thereof; and any combination thereof. In exemplary embodiments, the carboxylic acid monomer is magnesium acrylate. In certain embodiments, the cationic monomer is selected from the group consisting of 2-(Acryloyloxy)ethyl-trimethylammonium chloride; 2-acrylamido)ethyl trimethylammonium chloride; 2-(methacroyloxy)ethyl trimethylammonium chloride; 2-(methacrylamido)ethyl trimethylammonium chloride; 2-(acryloyloxy)ethyl alkyldimethyl ammonium halide and 2-(acrylamido)ethyl alkyl dimethylammonium halide, wherein the alkyl group comprises $C_4$-$C_{20}$ carbon chain, and halide is chloride, bromide or iodide, and combinations thereof. In some embodiments, a coupling agent is added to the wellbore in at least one of the first treatment fluid, a separate stream, and combinations thereof. In some embodiments, a coupling agent is added to the wellbore in at least one of the first treatment fluid, a separate stream, and combinations thereof. As used herein, a coupling agent is a compound whose molecules contain functional groups that bond with both organic and inorganic materials and as such help bonding, adsorption or adhesion of materials of different polarities to each other.

Suitable coupling agents may include, but are not limited to a quaternary ammonium coupling agent; a silicone-based coupling agent (e.g., a silicone-based coupling agent comprising a siloxy moiety); and any combination thereof. Suitable quaternary ammonium coupling agents may comprise at least one alkyl group that contains a $C_6$-$C_{22}$ carbon chain including, but not limited to, trimethyltallowammonium chloride; trimethylcocoammonium chloride; octadecyltrimethylammonium bromide; dioctylammonium chloride; trioctylammonium chloride; any derivative thereof; and any combination thereof. A suitable commercially available quaternary ammonium coupling agent is 19N™, available from Halliburton Energy Services, Inc. in Houston, Tex.

Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyl-triethoxysilanes; beta-(3-4-epoxy-cyclohexyl)-ethyl-trimethoxysilane; vinyltrichlorosilane; vinyltris (beta-methoxyethoxy) silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyldimethoxysilane; r-aminopropyltriethoxysilane; N-[3-(trimethoxysilyl)propyl]-ethylenediamine; any derivative thereof; and any combination thereof. In some embodiments, the coupling agent may be present in an amount from an upper limit of about 5%, 4.8%, 4.6%, 4.4%, 4.2%, 4%, 3.8%, 3.6%, 3.4%, 3.2%, 3%, 28%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the polymerizable aqueous consolidation composition or the water-soluble polymerization initiator composition. In some embodiments, the coupling agent may be present in the treatment fluids in an amount from about 0.5% to about 3% by weight of the polymerizable aqueous consolidation composition or the water-soluble polymerization initiator composition. When the weight of the unconsolidated particulates and/or proppant particulates is known, approximately known or estimatable, the coupling agents may be present in an amount in the range of from about 0.05% to about 0.2% by weight of the of the unconsolidated particulates and/or proppant particulates.

In certain embodiments, a polymerization retarder is added to the wellbore in at least one of the first treatment fluid, a separate stream, and combinations thereof. Examples of polymerization retarders include at least one of potassium ferricyanide, potassium manganicyanide, hydroquinone, derivatives thereof, and combinations thereof. In several embodiments, a crosslinking multifunctional monomer is added to the wellbore in at least one of the first treatment fluid, a separate stream, and combinations thereof. In certain embodiments, the crosslinking multifunctional monomer is selected from the group consisting of ethylene bisacrylamide, methylene bisacrylamide, trimethylol propane triacrylate, trimethylol propylene glycol diacrylate, ethyleneglycol diacrylate, pentaerythrytol triacrylate, pentaerythrytol diacrylate, triallylcyanurate, and combinations thereof.

Some embodiments of the present invention provide a method for treating a well including providing a wellbore in a subterranean formation; providing a first treatment fluid comprising an aqueous base fluid, a polyvalent metal salt of a carboxylic acid containing monomer, a cationic monomer, and proppant particulates; providing a second treatment fluid comprising a substantially solids-free aqueous base fluid; providing a third stream comprising a polymerization initiator; placing the first stream into the subterranean formation at a rate and pressure sufficient to create or enhance at least one fracture therein, wherein the proppant particulates are coated with the aqueous base fluid, polyvalent metal salt of a carboxylic acid containing monomer, and cationic monomer, and said coated proppant particulates form a proppant pack in the at least one fracture; placing the second stream into the wellbore, wherein the second stream removes at least one component of the first stream from unwanted areas; placing the third stream into the wellbore in a position to contact the proppant particulates; and forming consolidated proppant particulates upon the contacting of the polyvalent metal salt of a carboxylic acid containing monomer, cationic monomer and the polymerization initiator with the proppant particulates in the proppant pack. In some embodiments, the forming (consolidation) includes crosslinking of the polyvalent metal salt of a carboxylic acid containing monomer and the cationic monomer, thereby forming a crosslinked polymeric compound. In further embodiments, the crosslinked polymeric compound is cured while being adsorbed onto the unconsolidated proppant particulates. In certain embodiments, polymerization initiator comprises a radical generating organic initiator. Preferred examples of the radical generating organic initiator may be selected from the group consisting of an azo-initiator; a peroxide initiator; a hydroperoxide initiator; and any combination thereof. In some embodiments, preferred examples of the carboxylic acid monomer are selected from the group consisting of acrylic acid; alkyl-acrylic acid; derivatives thereof; and any combination thereof. In exemplary embodiments, the carboxylic acid monomer is magnesium acrylate. In certain embodiments, the cationic monomer is selected from the group consisting of 2-(Acryloyloxy) ethyl-trimethylammonium chloride; 2-acrylamido)ethyl trimethylammonium chloride; 2-(methacroyloxy)ethyl trimethylammonium chloride; 2-(methacrylamido)ethyl trimethylammonium chloride; 2-(acryloyloxy)ethyl alkyldimethyl ammonium halide and 2-(acrylamido)ethyl alkyl dimethylammonium halide, wherein the alkyl group comprises a $C_4$-$C_{20}$ carbon chain, and halide is chloride, bromide or iodide; and combinations thereof. In some embodiments, the polymerizable aqueous consolidation composition may further comprise a non-ionic carboxylic acid derived comonomer. The non-ionic carboxylic acid derived comonomer may be present to aid in the polymerization and curing process and to provide additional carboxylic acid monomers with variable hydrophobicities, or desired molecular weights, if needed. Suitable non-ionic carboxylic acid derived comonomers include esters, amides, and nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; any derivatives thereof; and any combinations thereof.

In some embodiments, a coupling agent is added to the wellbore in at least one of the first treatment fluid, the second treatment fluid, the third treatment fluid, a separate stream, and combinations thereof. Suitable coupling agents may include, but are not limited to a quaternary ammonium coupling agent; a silicone-based coupling agent (e.g., a silicone-based coupling agent comprising a siloxy moiety); and any combination thereof. Suitable quaternary ammonium coupling agents may comprise at least one alkyl group that contains a $C_6$-$C_{22}$ carbon chain including, but not limited to, trimethyltallowammonium chloride; trimethylcocoammonium chloride; octadecyltrimethylammonium bromide; dioctylammonium chloride; trioctylammonium chloride; any derivative thereof; and any combination thereof. A suitable commercially available quaternary ammonium coupling agent is 19N™, available from Halliburton Energy Services, Inc. in Houston, Tex.

Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyl-triethoxysilanes; beta-(3-4-epoxy-cyclohexyl)-ethyltrimethoxysilane; vinyltrichlorosilane; vinyltris (beta-methoxyethoxy) silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyldimethoxysilane; r-aminopropyltriethoxysilane; N-[3-(trimethoxysilyl)propyl]-ethylenediamine; any derivative thereof; and any combination thereof. In certain embodiments, a polymerization retarder is added to the wellbore in at least one of the first treatment fluid, the second treatment fluid, the third treatment fluid, a separate stream, and combinations thereof. Examples of polymerization retarders include at least one of potassium ferricyanide, potassium manganicyanide, hydroquinone, derivatives thereof, and combinations thereof. In several embodiments, a crosslinking multifunctional monomer is added to the wellbore in at least one of the first treatment fluid, the second treatment fluid, the third treatment fluid, a separate stream, and combinations thereof. In certain embodiments, the crosslinking multifunctional monomer is selected from the group consisting of ethylene bisacrylamide, methylene bisacrylamide, trimethylol propane triacrylate, trimethylol propylene glycol diacrylate, ethyleneglycol diacrylate, pentaerythrytol triacrylate, pentaerythrytol diacrylate, triallylcyanurate, and combinations thereof.

Another embodiment of the invention includes a well treatment system including a well treatment apparatus configured to: form or provide a first stream comprising an aqueous base fluid, a polyvalent metal salt of a carboxylic acid containing monomer, and a cationic monomer; form or provide a second stream comprising a polymerization initiator; place the first stream into a zone in a subterranean formation, said zone comprising unconsolidated particulates; place the second stream comprising a polymerization initiator into the zone; and form consolidated particulates upon the contacting of the polyvalent metal salt of a carboxylic acid containing monomer, cationic monomer and the polymerization initiator with the unconsolidated particulates. In some embodiments, the forming includes crosslinking of the polyvalent metal salt of a carboxylic acid containing monomer, the cationic monomer, and a crosslinker thereby forming a crosslinked polymer compound. In further embodiments, the crosslinked polymer compound is cured and adsorbed onto the unconsolidated particulates. In certain embodiments, polymerization initiator comprises a radical generating organic initiator. Preferred examples of the radical generating organic initiator may be selected from the group consisting of an azo-initiator; a peroxide initiator; a hydroperoxide initiator; and any combination thereof. In some embodiments, preferred examples of the carboxylic acid monomer are selected from the group consisting of acrylic acid; alkyl-acrylic acid; derivatives thereof; and any combination thereof. In exemplary embodiments, the carboxylic acid monomer is magnesium acrylate. In certain embodiments, the cationic monomer is selected from the group consisting of 2-(Acryloyloxy)ethyl-trimethylammonium chloride; 2-acrylamido)ethyl trimethylammonium chloride; 2-(methacroyloxy)ethyl trimethylammonium chloride; 2-(methacrylamido)ethyl trimethylammonium chloride; 2-(acryloyloxy)ethyl alkyldimethyl ammonium halide and 2-(acrylamido)ethyl alkyl dimethylammonium halide, wherein the alkyl group comprises a $C_4$-$C_{20}$ carbon chain, and halide is chloride, bromide or iodide; and combinations thereof. In some embodiments, the polymerizable aqueous consolidation composition may further comprise a non-ionic carboxylic acid derived comonomer. The non-ionic carboxylic acid derived comonomer may be present to aid in the polymerization and curing process and to provide additional carboxylic acid monomers with variable hydrophobicities, or desired molecular weights, if needed. Suitable non-ionic carboxylic acid derived comonomers include esters, amides, and nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; any derivatives thereof; and any combinations thereof. One of skill in the art may determine the rate of curing by adjusting the compositions of and the amount of the components in the first and or second streams. In some embodiments, the adjusting of the types and amounts of components is based on the downhole temperature. In some embodiments, a coupling agent is added to the wellbore in at least one of the first treatment fluid, the second treatment fluid, a separate stream, and combinations thereof. Suitable coupling agents may include, but are not limited to a quaternary ammonium coupling agent; a silicone-based coupling agent (e.g., a silicone-based coupling agent comprising a siloxy moiety); and any combination thereof. Suitable quaternary ammonium coupling agents may comprise at least one alkyl group that contains a $C_6$-$C_{22}$ carbon chain including, but not limited to, trimethyltallowammonium chloride; trimethylcoammonium chloride; octadecyltrimethylammonium bromide; dioctylammonium chloride; trioctylammonium chloride; any derivative thereof; and any combination thereof. A suitable commercially available quaternary ammonium coupling agent is 19N™. Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyl-triethoxysilanes; beta-(3-4-epoxy-cyclohexyl)-ethyl-trimethoxysilane; vinyltrichlorosilane; vinyltris (beta-methoxyethoxy) silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyldimethoxysilane; r-aminopropyltriethoxysilane; N-[3-(trimethoxysilyl)propyl]-ethylenediamine; any derivative thereof; and any combination thereof. In certain embodiments, a polymerization retarder is added to the wellbore in at least one of the first treatment fluid, the second treatment fluid, a separate stream, and combinations thereof. Examples of polymerization retarders include at least one of potassium ferricyanide, potassium manganicyanide, hydroquinone, derivatives thereof, and combinations thereof. In several embodiments, a crosslinking multifunctional monomer is added to the wellbore in at least one of the first treatment fluid, the second treatment fluid, a separate stream, and combinations thereof. In certain embodiments, the crosslinking multifunctional monomer is selected from the group consisting of ethylene bisacrylamide, methylene bisacrylamide, trimethylol propane triacrylate, trimethylol propylene glycol diacrylate, ethyleneglycol diacrylate, pentaerythrytol triacrylate, pentaerythrytol diacrylate, triallylcyanurate, and combinations thereof.

One of the advantages of some embodiments of the present invention is the ability to tailor the rate of the crosslinking reaction by the addition of one or more polymerization rate retarders. Other advantages may be evident to one skilled in the art.

Before the crosslinking reaction occurs, the treatment fluids of the present invention may comprise an aqueous base fluid, a polyvalent metal salt of a carboxylic acid containing monomer, a cationic monomer; a crosslinking multifunctional monomer and a polymerization initiator. After the crosslinking reaction occurs, a treatment fluid in accordance with the present invention may comprise an aqueous base fluid and a reaction product of a polyvalent metal salt of a carboxylic acid containing monomer with a cationic monomer, and the crosslinking agent. The reaction may initiate before contacting the proppant particles, or after the particles have been contacted.

Aqueous Carrier Fluids

The aqueous carrier fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 $g/cm^3$ or greater).

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid. When the solubility of the polyvalent metal salt of carboxylic acid, the water-soluble polymerization initiator, or other components that may be added to the fluids described herein are low, a solvent may optionally be included with the aqueous base fluid so as to aid in solubility and/or polymerization and curing of the polyvalent metal salt of carboxylic acid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. For purposes of this disclosure, a material is considered as water-soluble if the solubility of the material in water at room temperature is 5% or higher.

Carboxylic Add Containing Monomers

Treatment fluids of the present invention comprise a polyvalent metal salt of a carboxylic acid containing monomer. In some embodiments, the monomer comprises acrylic acid; alkyl-acrylic acid; and any combination thereof. In certain embodiments, an alkyl-acrylic acid is a $C_1$-$C_{20}$ alkyl-acrylic acid, represented by Formula 1.

$$CH_2=C(R)-C(O)O^-M^{p+} \qquad \text{Formula 1}$$

where R is $(C_nH_{2n+1})$ and where n=1-20 and p is 2 or higher.

Non-limiting examples of a water soluble, polymerizable monomeric acrylates suitable for use in the treatment fluids include calcium and magnesium salts of acrylic acid, salts of methacrylic acid, and combinations thereof.

In one embodiment, the polyvalent metal salt of a carboxylic acid containing monomer is magnesium acrylate and has the structure in Formula 2.

$$(CH_2=CH-C(O)O^-)_2Mg \qquad \text{Formula 2}$$

In various embodiments, an amount of the polyvalent metal salt of a carboxylic acid containing monomer present in the treatment fluids is from about 1 wt. % to about 30 wt. %, alternatively, about 5 wt. % to about 20 wt. % alternatively about 10 wt. % to about 15 wt. % based on weight of carrier fluid used in the treatment fluid.

Cationic Monomers

The treatment fluids of the present invention also include cationic monomers. Non-limiting examples of cationic monomers include 2-(Acryloyloxy)ethyl-trimethylammonium chloride, and combinations thereof.

In one embodiment, the cationic monomer is 2-(Acryloyloxy)ethyl-trimethylammonium chloride, which has the following structure:

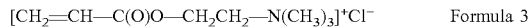
$$[CH_2=CH-C(O)O-CH_2CH_2-N(CH_3)_3]^+Cl^- \qquad \text{Formula 3}$$

In various embodiments, an amount of the cationic monomer present in the treatment fluids is from about 1 wt. % to about 30 wt. %, alternatively, about 5 wt. % to about 20 wt. % alternatively about 10 wt. % to about 15 wt. % based on weight of carrier fluid used in the treatment fluid.

Non-Ionic Monomers

In some embodiments, the polymerizable aqueous consolidation composition may further comprise a non-ionic carboxylic acid derived comonomer. The non-ionic carboxylic acid derived comonomer may be present to aid in the polymerization and curing process and to provide additional carboxylic acid monomers with variable hydrophobicities, or desired molecular weights, if needed. Suitable non-ionic carboxylic acid derived comonomers include esters, amides, and nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; any derivatives thereof; and any combinations thereof. In some embodiments, the non-ionic carboxylic acid derived comonomer may be present in the polymerizable aqueous consolidation composition in an amount in the range of from an upper limit of about 10%, 9%, 8%, 7%, 6%, and 5% to a lower limit of about 0.01%, 0.05%, 1%, 1%, 3%, 4%, and 5% by weight of the polymerizable aqueous consolidation composition. In some embodiments, the non-ionic carboxylic acid derived comonomer may be present in the polymerizable aqueous consolidation composition in an amount in the range of from about 0.1% to about 5% by weight of the polymerizable aqueous consolidation composition.

Monomer Ratios

In some embodiments, the molar ratio of polyvalent metal salt of a carboxylic acid containing monomer/cationic monomer ratio is 5:95 to 95:5, alternately, 25:75 to 75/25. The overall charge of the polymer product may be anionic or cationic or electrically neutral. The molar ratio of polyvalent metal salt of a carboxylic acid containing monomer to non-ionic monomer is 50:50 to 95:5, alternately, 60:40 to 80:20.

Polymerization Initiators

The treatment fluids of the present invention also include at least one polymerization initiator to polymerize and crosslink at least a portion of the molecules of the monomers to form a crosslinked polymer. As used herein, the term "polymerization initiator" includes any molecule, atom, or ion that is capable of initiating polymerization of at least one of the monomers present in the composition. The term "crosslink" as used herein refers to a covalent or ionic bond that links one polymer chain to another.

A variety of polymerization initiators can be used in accordance with the present embodiments. In some embodiments, the polymerization initiators are radical generating organic initiators. In certain embodiments, the radical generating organic initiator is at least one selected from the group consisting of an azo-initiator; a peroxide initiator; a hydroperoxide initiator; and any combination thereof. In an embodiment, a water soluble radical generating organic initiator is preferred. Suitable water soluble azo initiators are available commercially from Wako Chemicals USA, Inc, Richmond, Va. and from Halliburton Energy Services, Inc. under the trade name PERM C and PERM D. In some embodiments, an inorganic polymerization initiator may be used. A suitable inorganic polymerization initiator is a peroxy salt. Suitable peroxy salts may include, but are not limited to, sodium persulfate; potassium persulfate; ammonium persulfate; sodium perborate; sodium percarbonate; any derivative thereof; and any combination thereof. In exemplary embodiments, the inorganic water-soluble polymerization initiator selected is sodium persulfate. The inorganic water-soluble polymerization initiator may be present in an amount in the range of from and upper limit of about 5%, 4.8%, 4.6%, 4.4%, 4.2%, 4%, 3.8%, 3.6%, 3.4%, 3.2%, 3%, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the water-soluble polymerizable monomer composition. In other embodiments, the inorganic water-soluble polymerization initiator may be present in an amount in the range of from about 1% to about 2% by weight of the water-soluble polymerizable monomer composition.

Having the benefit of the present disclosure and knowing the temperature and chemistry of a subterranean formation of interest, one having ordinary skill in the art will be able to choose a polymerization initiator and an amount thereof suitable for producing a desired compressive strength of consolidated proppant particulates.

Generally, the polymerization initiator is present in the current treatment fluids in an amount sufficient to provide a desired degree of crosslinking of the monomers. In some embodiments, the amount of polymerization initiator present can be sufficient to achieve complete crosslinking, although incomplete crosslinking may be more preferable in other embodiments. In certain embodiments, the polymerization initiator is present in an amount of less than about 5% by weight of the treatment fluid. In other embodiments, the polymerization initiator is present in an amount of less than about 3% by weight of the treatment fluid. In some embodiments, the polymerization initiator is present in the amount of from about 0.1% to about 5% by weight of the treatment fluid. In certain embodiments, the polymerization initiator is present in the amount of from about 0.1% to about 3% by weight of the treatment fluid. In further embodiments, the polymerization initiator is present in the amount of from about 0.1% to about 2% by weight of the treatment fluid. In other embodiments, the polymerization initiator is present in the amount of from about 1% to about 3% by weight of the treatment fluid.

Polymerization Rate Retarders

In some embodiments, the treatment fluids include a polymerization rate retarder. These may include at least one of the following: potassium ferricyanide; potassium manganicyanide; hydroquinone; derivatives thereof; and combinations thereof. In certain embodiments, the polymerization rate retarder is present in an amount of less than about 5% by weight of the treatment fluid. In other embodiments, the polymerization rate retarder is present in an amount of less than about 3% by weight of the treatment fluid.

Crosslinking Multifunctional Monomers

The treatment fluids of the present invention my further comprise a crosslinking multifunctional monomer. Crosslinking multifunctional monomers suitable for use in combination with the treatment fluids include without limitation ethylene bisacrylamide, methylene bisacrylamide, trimethylol propane triacrylate, trimethylol propylene glycol diacrylate, ethyleneglycol diacrylate, pentaerythrytol triacrylate, pentaerythrytol diacrylate, triallylcyanurate and mixtures thereof. The amount of the cross-linking multifunctional monomer may range from about 0.01 wt. % to about 5 wt. %, alternately, from about 0.1 wt. % to about 2 wt. % by weight of the polymerizable monomers.

Coupling Agents

The treatment fluids of the present invention may further comprise a coupling agent. Coupling agents suitable for use in combination with the treatment fluids include without limitation a quaternary ammonium compounds, or a silicone-based coupling agent (e.g., a silicone-based coupling agent comprising a siloxy moiety); and any combination thereof. Suitable quaternary ammonium coupling agents may comprise at least one alkyl group that contains a $C_6$-$C_{22}$ carbon chain including, but not limited to, trimethyltallowammonium chloride; trimethylcocoammonium chloride; octadecyltrimethylammonium bromide; dioctylammonium chloride; trioctylammonium chloride; any derivative thereof; and any combination thereof. A suitable commercially available quaternary ammonium coupling agent is 19N™, available from Halliburton Energy Services, Inc. in Houston, Tex.

Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyl-triethoxysilanes; beta-(3-4-epoxy-cyclohexyl)-ethyl-trimethoxysilane; vinyltrichlorosilane; vinyltris (beta-methoxyethoxy) silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyl-dimethoxysilane; r-aminopropyltriethoxysilane; N-[3-(trimethoxysilyl)propyl]-ethylenediamine; any derivative thereof; and any combination thereof. The amount of the coupling agent may range from about 0.01 wt. % to about 5 wt. %, alternately, from about 0.1 wt. % to about 2 wt. % by weight of the polymerizable monomers.

Polymerization Agents

The polymerizable aqueous consolidation compositions may contain a polymerization agent that may aid in controlling the polymerization time at a given temperature. Suitable polymerization agents include, but are not limited to, an amine; an amino alcohol; and any combination thereof. Suitable amines for use in the polymerizable aqueous consolidation compositions disclosed herein may include, but are not limited to, diethylene triamine; triethylene tetraamine; tetraethylene pentaamine; a polymeric amine (e.g., polyethyleneeimine, polyvinylamine, and the like); N,N-bis-(2-hydroxyethyl para-toluidine; Fe(III)-tetraamidomacrocyclic ligand; and any combination thereof. Derivatives of these compounds may also be used. Suitable amino alcohols for use in the polymerizable aqueous consolidation compositions disclosed herein may include, but are not limited to, ethanolamine; diethanolamine; triethanolamine; propanolamine; tripropanolamine; any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. In exemplary embodiments, the amino alcohol selected is triethanolamine. The polymerization agent may be present in the polymerizable aqueous consolidation composition in a concentration in an amount in the range of from about 10 times to about 0.1 times the concentration of the water-soluble polymerization initiator in the water-soluble polymerization initiator composition, including all values therebetween. In some embodiments, the polymerization agent may be present in the polymerizable aqueous consolidation composition described herein in an amount in the range of from an upper limit of about 2%, 1.8%, 1.6%, 1.4%, 1.2%, 1%, and 0.8% to a lower limit of about 0.01%, 0.20%, 0.4%, 0.6%, and 0.8% by weight of the polymerizable aqueous consolidation composition.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition.

In exemplary embodiments, it is believed that the proppants, with negatively charged surfaces, may bond to the cationic monomers mentioned above, thereby creating a consolidated proppant pack without leaching into the aqueous medium prior to consolidation. The bonding to the proppants may occur before the crosslinking has occurred, or after the crosslinking between the monomers has been initiated. In one embodiment, the proppant is sand that is negatively charged, and the cationic monomers have a strong adsorption tendency to the surfaces of the sand. In some embodiments, the sand may be graded sand that is sized based on a knowledge of the size of the lost circulation zone. The graded sand may have a particle size in the range of from about 10 to about 70 mesh, U.S. Sieve Series.

In certain embodiments, the proppants are present in an amount of less than about 5% by volume of the treatment fluid. In other embodiments, the proppants are present in an amount of less than about 3% by volume of the treatment fluid.

In some embodiments, the proppants are coated with uncrosslinked or crosslinked polymers before they have been placed downhole. In other embodiments, the proppants are coated after they have been placed in the subterranean formation. In certain embodiments, the proppants are coated with monomers before they have been placed in the formation. A polymerization initiator is then added to initiate polymerization and crosslinking of the coated monomers, thereby consolidating the proppants.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a nonaqueous liquid, which may be combined with the aqueous base fluid at a subsequent time. After the preblended liquids and the aqueous base fluid have been combined polymerization initiators and other suitable additives may be added prior to introduction into the wellbore. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

In some embodiments, the present treatment fluids can be used in a subterranean formation having a temperature of up to about 250° F. In some embodiments, the present treatment fluids can be used in a subterranean formation having a temperature of up to about 220° F. In some embodiments, the present treatment fluids can be used in a subterranean formation having a temperature ranging between about 75° F. and about 250° F. In some embodiments, the present treatment fluids can be used in a subterranean formation having a temperature ranging between about 100° F. and about 250° F. In some embodiments, the present treatment fluids can be used in a subterranean formation having a temperature ranging between about 150° F. and about 250° F. In some embodiments, the present treatment fluids can be used in a subterranean formation having a temperature ranging between about 175° F. and about 250° F. In some embodiments, the present treatment fluids can be used in a subterranean formation having a temperature ranging between about 200° F. and about 250° F. In some embodiments, the present treatment fluids can be used in a subterranean formation having a temperature ranging between about 220° F. and about 250° F.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the polymerizable aqueous consolidation compositions and/or the water-soluble polymerization initiator compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Sand Pack Testing

Example 1

In one example, 5 mL of Superflex Gelacryl™ mixed with 20 mg of Perm C was coated onto 100 gram of 20/40 Brady sand. The coated sand was packed into 60 mL syringe along with plunger to apply a minimal pressure. The syringe was placed into the 100° C. oven for 72 hours for the complete curing. Unconfined Compressive Strength (UCS) was measured with a value of 407 psi. Superflex Gelacryl™ is magnesium acrylate and is commercially available from De Neef Corporation. Perm C is an azo initiator available from Halliburton Energy Services, Inc.

Example 2

In another example, 5 mL of Superflex Gelacryl™ mixed with 20 mg of Perm C and 0.1 mL of 19N™ (coupling agent, a cationic surfactant available from Halliburton Energy Services, Inc.) was coated onto 100 grams of 20/40 Brady sand. The coated sand was packed into 60 mL syringe along with plunger to apply a minimal pressure. The syringe was placed into the 100° C. oven for 72 hours for the complete curing. UCS was measured with a value of 647 psi. This experiment indicates that with the addition of 19N™, the strength increase some comparing to Example 1.

Example 3

In the present example, 5 mL of Superflex Gelacryl™ mixed with 20 mg of Perm C and 0.25 mL of 2-(Acryloyloxy)ethyl-trimethylammonium chloride solution (an 80% active cationic monomer solution in water available Aldrich-Sigma Chemical Company, to improve the affinity to the sand surface) was coated onto 100 grams of 20/40 Brady sand. The coated sand was packed into 60 mL syringe along with the plunger to apply a minimal pressure. The syringe was placed into the 100° C. oven for 72 hours for the complete curing. UCS was measured with a value of 903 psi. The strength is more than double the strength of the sample in Example 1.

Example 4

In this example, 5 mL of Superflex Gelacryl™ mixed with 20 mg of Perm C and 0.50 mL of 2-(Acryloyloxy)ethyl-trimethylammonium chloride solution (80% active) was coated onto 100 gram of 20/40 Brady sand. The coated sand was packed into 60 mL syringe along with a plunger to apply a minimal pressure. The syringe was placed into the 100° C. oven for 72 hours for the complete curing. UCS was measured with a value of 1039 psi. The strength is slightly higher than the strength of the sample in Example 3.

Example 5

In the current example, 5 mL of Superflex Gelacryl™ mixed with 20 mg of Perm C, 0.50 mL of 2-(Acryloyloxy)ethyl-trimethylammonium chloride solution (80% active) and 0.5 mL of pentaerythritol triacrylate (a crosslinker, with 0.3 mL Musol E™), to reduce the phase separation, was coated onto 100 gram of 20/40 Brady sand. Musol E™ is a water-miscible alcohol ether mutual solvent available from Halliburton Energy Services, Inc. The coated sand was packed into 60 mL syringe along with a plunger to apply a minimal pressure. The syringe was placed into the 100° C. oven for 72 hours for the complete curing. UCS was measured with a value of 2453 psi. This indicates that with the addition of a crosslinker, the strength is more than double the strength of the sample in Example 4.

Table 1 Summarizes Examples 1-5

TABLE 1

| | (Normal Kill Pill Composition with Full Stabilizers) | | | | | | |
|---|---|---|---|---|---|---|---|
| Example # | 20/40 Brady Sand (g) | Superflex (ml) | (2-(Acryloyloxy)ethyl)-Trimethylammonium Chloride Solution (ml) | Pentaerythritol Triacrylate (ml) | Perm C (mg) | 19N (ml) | UCS (psi) |
| 1 | 100 | 5 | N/A | 0 | 20 | 0 | 407 |
| 2 | 100 | 5 | N/A | 0 | 20 | 0.1 | 647 |
| 3 | 100 | 5 | 0.25 | 0 | 20 | 0 | 903 |
| 4 | 100 | 5 | 0.5 | 0 | 20 | 0 | 1039 |
| 5 | 100 | 5 | 0.5 | 0.5* | 20 | 0 | 2453 |

Note:
*with 0.3 ml of Musol E ™.

One of skill in the art will appreciate that the data in Table 1 demonstrates that high strength consolidated sand can be obtained by the improved bonding of the crosslinked polymer to sand grains due to the utilization of a cationic monomer with a high affinity for sand surfaces.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:
1. A well treatment method comprising:
providing wellbore in a subterranean formation;

placing a first stream comprising an aqueous base fluid, a polyvalent metal salt of a carboxylic acid containing monomer, and a cationic monomer into a zone in the subterranean formation, said zone comprising unconsolidated particulates, wherein the cationic monomer is selected from the group consisting of 2-(Acryloyloxy) ethyl-trimethylammonium chloride; 2-(acrylamido) ethyl trimethylammonium chloride; 2-(methacroyloxy) ethyl trimethylammonium chloride; 2-(methacrylamido)ethyl trimethylammonium chloride; 2-(acryloyloxy)ethyl alkyldimethyl ammonium halide; 2-(acrylamido)ethyl alkyl dimethylammonium halide, wherein the alkyl group comprises a $C_4$-$C_{20}$ carbon chain, and the halide is chloride, bromide or iodide; and any combination thereof;

placing a second stream comprising a polymerization initiator into the zone; and forming consolidated particulates upon contacting of the polyvalent metal salt of a carboxylic acid containing monomer, the cationic monomer and the polymerization initiator with the unconsolidated particulates.

2. The method of claim 1, wherein the polymerization initiator comprises at least one of a radical generating organic initiator; an inorganic peroxy compound; and combinations thereof.

3. The method of claim 2, wherein the radical generating organic initiator is selected from the group consisting of an azo-initiator; a peroxide initiator; a hydroperoxide initiator; and any combination thereof.

4. The method of claim 2, wherein the inorganic peroxy compound is selected from the group consisting of sodium persulfate; potassium persulfate; ammonium persulfate; sodium perborate; sodium percarbonate; any derivative thereof; and any combination thereof.

5. The method of claim 1, wherein the first stream or the second stream further comprises a polymerization agent, wherein the polymerization agent accelerates the polymerization rates of the polymerization initiator.

6. The method of claim 1, wherein the carboxylic acid monomer is selected from the group consisting of acrylic acid; alkyl-acrylic acid; derivatives thereof and any combination thereof.

7. The method of claim 1, wherein the polyvalent metal of the polyvalent metal salt of carboxylic acid is selected from the group consisting of aluminum ions; barium ions; calcium ions; cobalt ions; copper ions; iron ions; lead ions; magnesium ions; nickel ions; tin ions; zinc ions; and any combination thereof.

8. The method of claim 1, wherein the aqueous base fluid comprises a solvent selected from the group consisting of an alcohol; a glycol; a glycol ether; a polyether; and any combination thereof.

9. The method of claim 1, wherein the cationic monomer is 2-(Acryloyloxy)ethyl-trimethylammonium chloride.

10. The method of claim 1, wherein the first stream or the second stream further comprises a non-ionic carboxylic acid derived comonomer.

11. The method of claim 10, wherein the non-ionic carboxylic acid derived comonomer comprises at least one compound selected from the group consisting of esters, amides, and nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; any derivatives thereof and any combinations thereof.

12. The method of claim 1, wherein the first stream or the second stream further comprises a coupling agent.

13. The method of claim 12, wherein the coupling agent is selected from the group consisting of a quaternary ammonium compound; a silicon-based coupling agent comprising a siloxy moiety; and combinations thereof.

14. The method of claim 1, wherein the first or second stream further comprises a polymerization retarder.

15. The method of claim 1, wherein the first stream or second stream further comprises a crosslinking multifunctional monomer.

16. The method of claim 15, wherein the crosslinking multifunctional monomer is selected from the group consisting of ethylene bisacrylamide, methylene bisacrylamide, trimethylol propane triacrylate, trimethylol propylene glycol diacrylate, ethyleneglycol diacrylate, pentaerythrytol triacrylate, pentaerythrytol diacrylate, triallylcyanurate, and combinations thereof.

17. The method of claim 1, further comprising placing a third stream including a crosslinking multifunctional monomer into the zone.

18. The method of claim 17, wherein the forming comprises crosslinking of the polyvalent metal salt of a carboxylic acid containing monomer, the cationic monomer, and the crosslinking multifunctional monomer, thereby forming a crosslinked polymer compound.

19. The method of claim 18, further comprising curing the crosslinked polymer compound while the compound is adsorbed onto the unconsolidated particulates.

20. The method of claim 1, wherein the forming comprises crosslinking of the polyvalent metal salt of a carboxylic acid containing monomer and the cationic monomer, thereby forming a crosslinked polymer compound.

21. The method of claim 20, further comprising curing the crosslinked polymer compound while the compound is adsorbed onto the unconsolidated particulates.

22. A well treatment method comprising:
providing wellbore in a subterranean formation;
placing a first stream comprising an aqueous base fluid, a polyvalent metal salt of a carboxylic acid containing monomer, and a cationic monomer into a zone in the subterranean formation, said zone comprising unconsolidated particulates;
placing a second stream comprising a polymerization initiator into the zone; and
forming consolidated particulates upon contacting of the polyvalent metal salt of a carboxylic acid containing monomer, the cationic monomer and the polymerization initiator with the unconsolidated particulates, wherein the zone comprises proppant particulates forming a proppant pack in a fracture.

23. The method of claim 22, wherein the proppant is sand.

24. A method comprising:
placing a first stream comprising an aqueous base fluid, a polyvalent metal salt of a carboxylic acid containing monomer, a cationic monomer, and a polymerization initiator into a wellbore in a subterranean formation, said formation comprising unconsolidated particulates, wherein the cationic monomer is selected from the group consisting of 2-(Acryloyloxy)ethyl-trimethylammonium chloride; 2-(acrylamido)ethyl trimethylammonium chloride; 2-(methacroyloxy)ethyl trimethylammonium chloride; 2-(methacrylamido)ethyl trimethylammonium chloride; 2-(acryloyloxy)ethyl alkyldimethyl ammonium halide; 2-(acrylamido)ethyl alkyl dimethylammonium halide, wherein the alkyl group comprises a $C_4$-$C_{20}$ carbon chain, and the halide is chloride, bromide or iodide; and any combination thereof; and forming consolidated particulates upon contacting of polyvalent metal salt of a carboxylic acid containing monomer, the cationic monomer and the polymerization initiator with the unconsolidated particulates.

25. A method comprising:

providing a wellbore in a subterranean formation;

placing a first stream comprising an aqueous base fluid, a polyvalent metal salt of a carboxylic acid containing monomer, a cationic monomer and proppant particulates into the subterranean formation at a rate and pressure sufficient to create or enhance at least one fracture therein, wherein the proppant particulates are coated with the aqueous base fluid, the polyvalent metal salt of a carboxylic acid containing monomer, and the cationic monomer during the suspension of the proppant in the first stream, and said coated proppant particulates form a proppant pack in the at least one fracture;

placing a second stream into the wellbore comprising a substantially solids-free aqueous base fluid, wherein the second stream removes at least one component of the first stream from unwanted areas;

placing a third stream comprising a polymerization initiator into the wellbore in a position to contact the proppant particulates; and forming consolidated proppant particulates upon contacting of the polyvalent metal salt of a carboxylic acid containing monomer, the cationic monomer and the polymerization initiator with the proppant particulates in the proppant pack.

26. A well treatment system comprising:

a well treatment apparatus configured to:

form or provide a first stream comprising an aqueous base fluid, a polyvalent metal salt of a carboxylic acid containing monomer, and a cationic monomer, wherein the cationic monomer is selected from the group consisting of 2-(Acryloyloxy)ethyl-trimethylammonium chloride; 2-(acrylamido)ethyl trimethylammonium chloride; 2-(methacroyloxy)ethyl trimethylammonium chloride; 2-(methacrylamido)ethyl trimethylammonium chloride; 2-(acryloyloxy)ethyl alkyldimethyl ammonium halide; 2-(acrylamido)ethyl alkyl dimethylammonium halide, wherein the alkyl group comprises a $C_4$-$C_{20}$ carbon chain, and the halide is chloride, bromide or iodide; and any combination thereof;

form or provide a second stream comprising a polymerization initiator;

place the first stream into a zone in a subterranean formation, said zone comprising unconsolidated particulates;

place the second stream comprising a polymerization initiator into the zone; and form consolidated particulates upon contacting of the polyvalent metal salt of a carboxylic acid containing monomer, the cationic monomer and the polymerization initiator with the unconsolidated particulates.

* * * * *